Jan. 3, 1933.  J. W. COSGROVE  1,893,161
COATING APPARATUS
Filed Jan. 16, 1929
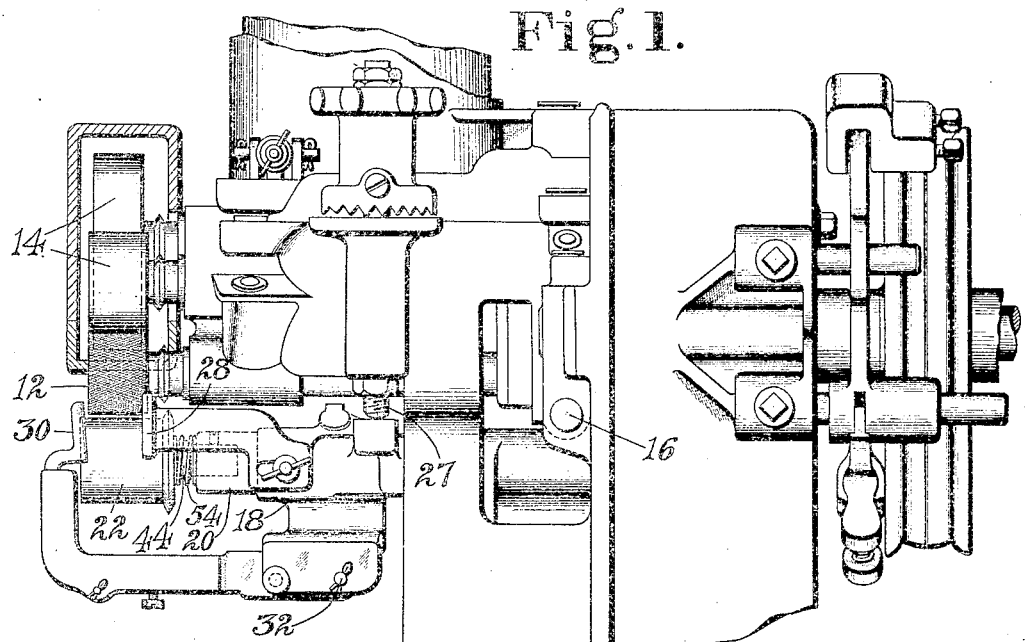
Fig. 1.
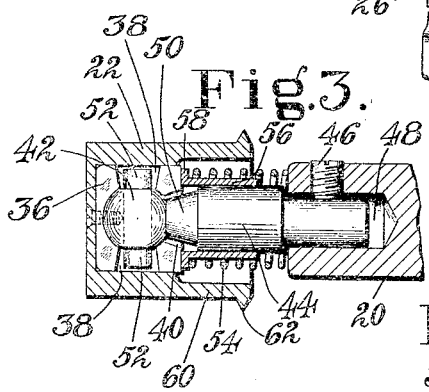
Fig. 3.
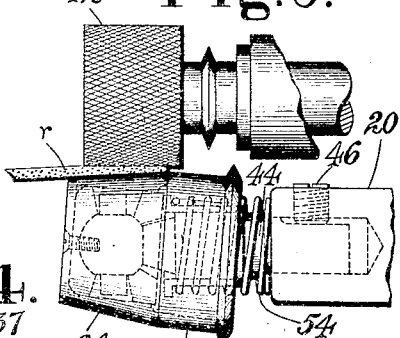
Fig. 5.
Fig. 4.
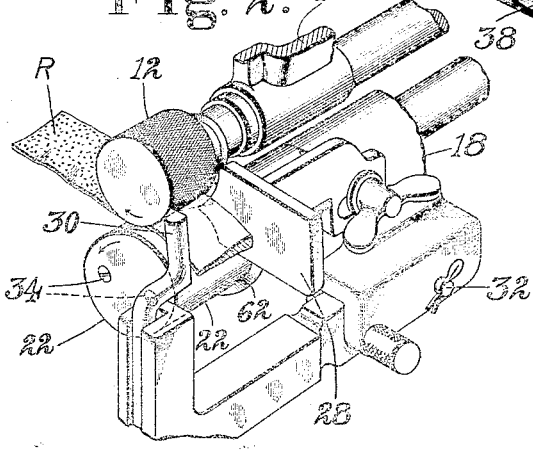
Fig. 2.
Fig. 6.
INVENTOR Patented Jan. 3, 1933

1,893,161

UNITED STATES PATENT OFFICE

JOHN W. COSGROVE, DECEASED, LATE OF MEDFORD, MASSACHUSETTS, BY CAROLINE E. COSGROVE, ADMINISTRATRIX, OF MEDFORD, MASSACHUSETTS, ASSIGNOR TO UNITED SHOE MACHINERY CORPORATION, OF PATERSON, NEW JERSEY, A CORPORATION OF NEW JERSEY

COATING APPARATUS

Application filed January 16, 1929. Serial No. 332,902.

The present invention relates to apparatus for applying to work-pieces a coating, as of an adhesive substance. It is particularly concerned with the coating of work in which the area to be operated upon and the opposite surface, to which pressure is applied to maintain the coating contact, are inclined with respect to each other. An example of such work is furnished by that having skived margins, as rands for shoes.

An object of the invention is to insure effective engagement between a roll, or other coating member, and the work, when the opposite surfaces engaged by said roll and its co-operating pressure member depart from parallelism or from any normal angular relation. In the accomplishment of this object, the invention provides a roll which is mounted to gyrate or tilt upon a member which is rotatable. A work-engaging member co-operates with the gyratory roll, and with the roll and member is associated means for supplying a coating substance for the work. With such an organization, the tilting of the roll upon its mounting permits it to assume the same angle as that of the surface upon which it is operating and to follow variations from the normal angle. This gives proper coating contact across the entire surface, and a uniform application of the substance results. Preferably, yieldable means is provided for maintaining the gyratory roll in a definite normal position, so that it is ready to respond to variations in the work. Herein, the mounting member is shown as a shaft, upon which a roll, as a pressure or work-supporting roll, is carried by a universal joint. This joint may consist of a spherical portion upon the end of the shaft, co-operating with a bearing carried within a hollow roll. Projections from the spherical portion are shown as entering openings in the bearing to give driving connection between the shaft and roll. In the illustrated embodiment of the invention, there is a cylindrical cement-applying roll, while upon a shaft adjacent thereto is a co-operating gyratory pressure-roll. This pressure-roll which acts to support the work, may be either cylindrical or frusto-conical. In the latter instance, and as illustrated, its periphery is so longitudinally inclined that it substantially corresponds to the normal bevel or wedge shape of the margin of a piece of work. Its capacity for tilting upon its shaft allows it to further accommodate itself to variations in the work.

The accompanying drawing shows one of the several forms this invention may assume, Fig. 1 being a front elevation of that portion of a cementing machine to which the present improvements apply;

Fig. 2, a perspective view of the co-operating applying and work-supporting rolls;

Fig. 3, a central longitudinal section through said work-supporting roll and its mounting;

Fig. 4, a perspective view of one of the bearing-blocks carried by the roll; and Figs. 5 and 6, details in elevation illustrating pressure-rolls having frusto-conical work-engaging portions.

The cementing apparatus disclosed in the Letters Patent of the United States No. 1,851,162, granted March 29, 1932, upon application filed March 6, 1928, in the name of Caroline E. Cosgrove, administratrix of the estate of John W. Cosgrove, deceased, and bearing the Serial No. 259,537, is a suitable one in which to employ the present invention. Of this apparatus, and particularly referring to Figs. 1 and 2 herein, there appears a frame 10, upon which is journaled the shaft of a cement-applying roll 12. Latex or other liquid adhesive is supplied to this roll from a receptacle (not illustrated) through a chain of rolls 14. Pivoted at 16 upon the frame is an arm 18, in which is rotatably mounted the shaft 20 of a supporting roll 22, which presses the work against the applying roll under the influence of a spring 24 acting upon a depending portion 26 of the arm 18. A screw 27, passing through the frame, contacts with the arm and adjustably limits the extent of approach of the roll 22 to the roll 12. These rolls are rotated about substantially parallel axes in the directions indicated by the arrows in Fig. 2. An inner adjustable edge-gage 28 determines the relation of the work to the applying roll in its advance through the apparatus, and if curved pieces, such as rands, are to be cemented, an outer adjustable gage 30 may be employed, this being brought into position about its pivotal connection at 32 to the arm 18.

It has been chosen, in this disclosure of the invention, to apply it to the pressure or work-supporting roll 22. This roll preferably consists of a cylindrical shell, closed at its outer extremity. Secured side by side in the shell, by screws 34 passing through the outer head, are the blocks 36, 36 of a divided bearing, having between its halves a generally spherical socket 37 (Fig. 4). Between the blocks are opposite lateral openings 38, 38 elongated longitudinally of the shell and having their end walls diverging outwardly. Surrounding the axis is a frusto-conical opening 40 divided between the two blocks. The socket 37 receives a spherical end portion 42 of the shaft 20, this portion being preferably formed upon an extension 44 of the shaft. This extension is separably secured in a socket 48 of the main shaft by a set-screw 46. Thus mounting the roll upon a shaft-extension facilitates the application to the apparatus of work-supporting rolls of different forms to adapt the apparatus to best operate upon diverse kinds of work. A tapering section 50 of the shaft-extension lies in the bearing-opening 40, while opposite alined trunnions or projections 52, 52 from the spherical end enter the openings 38. The shell is thus arranged for universal tilting movement about two axes transverse to the longitudinal axis of the shaft, one of these axes being that of the trunnions, and the other being at right angles to this through the center of the sphere. The amount of clearance between the walls of the bearing-openings and the co-operating portions of the shaft and trunnions limits the angular movement of the roll-shell. Normally, this shell is resiliently maintained with its longitudinal axis coincident with that of the shaft by a helical spring 54 surrounding the shaft-extension 44 and a sleeve 56 loose upon the extension. One end of the spring is shown as abutting against the end of the main section 20 of the shaft, while the other contacts with a flange 58 upon the outer end of the sleeve, forcing this against the bearing-blocks 36. Since cement may drip upon the supporting roll 22 from the edges of the applying roll, the former is extended inwardly at 60 beyond its field of direct co-operation with the applying roll, this extension surrounding and guarding the interior of the roll, the spring 54 and sleeve 56. Upon the inner extremity of the roll-shell is shown a peripheral flange 62. Any cement falling upon the extension 60 will flow to this flange, and by it be directed away from the enclosed elements.

In using this improved apparatus, strips R of material having opposite faces inclined with respect to each other, one of which faces is to be coated, are introduced between the rolls 12 and 22, positioned with reference to the former by the gage or gages, and are fed forward by the rotation of the rolls. Variations in thickness of the material may be provided for by the yield of the arm 18 about its pivot 16. If the opposite surfaces included between the rolls incline transversely of the margin in either direction, the work-supporting roll 22 will tilt upon its universal mounting, causing this roll to exert across the entire width of the work-strip a substantially uniform pressure, and thus bring about complete coating of the area engaged by the applying roll 12. This is true both of work in which there is a beveled margin extending throughout its length, and that in which the opposite sides depart irregularly either from such inclination or from parallelism.

If the normal transverse inclination of the work is greater than can be fully provided for by the yield of the cylindrical roll 22 upon its mounting, the supporting rolls illustrated in Figs. 5 and 6 of the drawing may be utilized. Each of these has a frusto-conical section, which engages the work, and the adjacent cylindrical guard-section 60 with its drip-flange 62. In Fig. 5, the work-engaging section 64 is adapted for co-operation with a work-strip $r$ having an inclined margin converging inwardly. The conical roll-section therefore has an outward taper. In Fig. 6, the opposite condition is provided for, the frusto-conical section 66 tapering in to accommodate inclined work $s$ with its thin edge outward. In either case, the inclination of the portion 64 and 66 may approximate the normal bevel of the work, the tilting of the rolls upon their mountings permitting them to adjust themselves to irregularities of said work. By such a frusto-conical construction the tilting of the roll necessary to accommodate the work will be minimized.

Having described the invention, what is claimed as new and desired to secure by Letters Patent of the United States is:

1. In a coating apparatus, a rotatable member, a work-engaging roll mounted to gyrate upon the member, yieldable means for maintaining the roll in a normal position upon its mounting member, a work-engaging member co-operating with the gyratory roll, and means for supplying a coating substance to one of said work-engaging elements for application to the work.

2. In a coating apparatus, a rotatable shaft, a roll tiltably mounted upon the shaft, a spring interposed between the roll and shaft, a roll co-operating with the tilting roll, and means for supplying a coating substance to said co-operating roll.

3. In a coating apparatus, a pair of driven co-operating rolls arranged to rotate about adjacent axes and to act upon opposite sides of the work, means for supplying a coating substance to one of the rolls, and a support for a roll constructed and arranged to permit said roll to tilt about a plurality of axes to adapt itself to work-surfaces varying in inclination, thereby to insure firm contact between the work and the coating roll.

4. In a coating apparatus, a pair of co-operating rolls arranged to act upon opposite sides of the work, means for supplying a coating substance to one of the rolls, a support for a roll constructed and arranged to permit said roll to tilt about a plurality of axes to adapt itself to work-surfaces varying in inclination, and means for automatically returning the tilting roll to normal position when released from the work.

5. In a coating apparatus, a shaft, an extension thereof, means for detachably securing the extension to the shaft, a work-engaging roll yieldably mounted upon the extension, and a guard flange arranged to prevent flow of the coating substance to the roll-mounting.

6. In a coating apparatus, a shaft, an extension thereof, means for detachably securing the extension to the shaft, a roll mounted to gyrate upon the extension, and a spring surrounding the extension and acting upon the shaft.

7. In a coating apparatus, a shaft, an extension thereof, means for detachably securing the extension to the shaft, a roll mounted to gyrate upon the extension and having a flange projecting from its periphery at the end toward the shaft, and a spring surrounding the extension and acting upon the roll.

8. In a cementing apparatus, a shaft, a work-engaging roll, a universal joint connecting the roll and shaft, and a spring contacting with the shaft and exerting its force upon the roll.

9. In a cementing apparatus, a shaft, a work-engaging roll, a universal joint connecting the roll and shaft, a sleeve surrounding the shaft and contacting with a portion of the universal joint, and a spring acting upon the sleeve.

10. In a cementing apparatus, a hollow roll, a shaft having a spherical portion, a bearing carried within the roll and co-operating with the spherical portion of the shaft, and a spring acting upon the bearing.

11. In a cementing apparatus, a hollow roll, a driven shaft for said roll, said shaft being provided with a spherical portion having trunnions, means within said roll for supporting it upon the driven shaft to tilt on the spherical portion and trunnions about a plurality of axes transverse to the axis of the shaft, and a spring arranged to return said roll to a normal position coaxial with the shaft.

12. In a cementing apparatus, a driven shaft having a spherical portion at its outer end, a hollow roll having a closed end, bearing-blocks within said roll secured to the closed end thereof and contacting with the spherical portion of the shaft, and means acting upon the bearing-blocks and constructed and arranged to return the roll to normal position after it has been displaced therefrom.

13. In a cementing apparatus, a hollow roll, a driven shaft for said roll having a spherical portion provided with laterally extending trunnions, and bearing-blocks within the roll having openings to receive the trunnions.

14. In a cementing apparatus, cement-applying means, a driven shaft having a socket at its outer end, an extension for said shaft secured in said socket and provided with a spherical portion, a hollow roll tiltably supported upon the spherical portion, a spring surrounding the extension and constructed and arranged to return the roll to a normal position substantially coaxial with the shaft, and means upon said roll arranged to divert cement accidentally deposited on the roll from the spring and the inside of the roll.

15. In a cementing apparatus, a rotatable cement-applying roll, a shaft rotatable adjacent to said applying roll, a pressure-roll co-operating with the applying roll and mounted on said shaft to tilt about a plurality of axes angularly related to the shaft, and means exerting a pressure upon one of said rolls to hold them in contact with a piece of work.

16. In a cementing apparatus, a rotatable cement-applying roll, a shaft rotatable adjacent to said applying roll, a pressure-roll co-operating with the applying roll to grip a piece of work and mounted to gyrate upon the shaft, and means arranged to maintain the pressure-roll yieldably in its normal position upon the shaft.

17. In a cementing apparatus, a shaft, another shaft rotatable adjacent to said first shaft, a frame in which one shaft is journaled, a member pivotally mounted on the frame in which the other shaft is journaled, a cement-applying roll on one shaft, means for supplying cement thereto, and a pressure-roll co-operating with the applying roll and mounted to gyrate upon the other shaft.

18. In a cementing apparatus, a cylindrical cement-applying roll, a shaft adjacent to the axis of said cement-applying roll, a co-operating work-supporting roll, and means for tiltably mounting the work-supporting roll upon the shaft, said work-supporting roll having a frusto-conical portion opposite the cement-applying roll, thereby to minimize the tilting movement required in gripping wedge-shaped pieces of work.

19. In a cementing apparatus, a cylindrical cement-applying roll, a shaft adjacent to the axis of said cement-applying roll, a work-supporting roll having a frusto-conical portion co-operating with the cement-applying roll for action upon wedge shaped pieces of work, means for tiltably mounting the work-supporting roll upon the shaft, and resilient means arranged to return said roll to a normal position with respect to the axis of the shaft.

20. In a cementing apparatus, a shaft, a cement-applying roll mounted upon said shaft, a second shaft adjacent to the first shaft, a co-operating work-supporting roll mounted upon said second shaft, said work-supporting roll having a frusto-conical section co-operating with the cement-applying roll for action upon wedge-shaped pieces of work, means for mounting the work-supporting roll upon its shaft constructed and arranged to allow tilting movement about a plurality of axes transverse to the axis of the shaft, and an extension from said roll arranged to divert cement from the mounting means.

21. In a cementing apparatus, a roll-shaft having a socket, a shaft extending from said socket, a hollow roll tiltably mounted upon the extension, means within said roll for supporting it upon the shaft-extension and constructed and arranged to allow said roll to gyrate upon the shaft, and a spring surrounding said extension between the shaft and supporting means, said roll having a frusto-conical work-engaging portion and a cylindrical extension surrounding the spring.

In testimony whereof I have signed my name to this specification.

CAROLINE E. COSGROVE,
*Administratrix of the Estate of John W. Cosgrove, Deceased.*